(12) United States Patent
Miller et al.

(10) Patent No.: US 7,730,420 B1
(45) Date of Patent: Jun. 1, 2010

(54) SYSTEMS AND METHODS FOR CREATING A PLAYLIST

(75) Inventors: Toby Miller, Dallas, GA (US); Chris McClellen, Acworth, GA (US); Stephen Reuben Windham, Jr., Marietta, GA (US); Thomas A Pratt, Atlanta, GA (US); Bradley Shawn Grant, Smyrna, GA (US); Scott E Storch, Kennesaw, GA (US)

(73) Assignee: The Weather Channel, Inc., Atlanta, GA (US)

(*) Notice: Subject to any disclaimer, the term of this patent is extended or adjusted under 35 U.S.C. 154(b) by 944 days.

(21) Appl. No.: 11/416,599

(22) Filed: May 3, 2006

(51) Int. Cl.
*G06F 3/00* (2006.01)
*G09G 5/00* (2006.01)
*G06F 3/048* (2006.01)

(52) U.S. Cl. .................. 715/810; 715/716; 715/719; 715/765; 725/37; 725/61

(58) Field of Classification Search .................. 715/716, 715/719, 727, 764, 765, 810, 783, 845, 205, 715/811; 725/37, 38, 134, 142, 46, 61
See application file for complete search history.

(56) References Cited

U.S. PATENT DOCUMENTS 6,933,433 B1* 8/2005 Porteus et al. ................. 84/615
2003/0093790 A1* 5/2003 Logan et al. ................... 725/38
2005/0020223 A1* 1/2005 Ellis et al. ................. 455/186.1
2006/0195515 A1* 8/2006 Beaupre et al. ............. 709/203
2006/0239131 A1* 10/2006 Nathan et al. ............ 369/30.06
2007/0074619 A1* 4/2007 Vergo .......................... 84/612
2008/0080837 A1* 4/2008 Mei et al. ...................... 386/95
2008/0263476 A1* 10/2008 Vignoli et al. .............. 715/810
2008/0301317 A1* 12/2008 Lee et al. ..................... 709/231

\* cited by examiner

*Primary Examiner*—X. L Bautista
(74) *Attorney, Agent, or Firm*—Lawrence A. Aaronson, P.C.

(57) ABSTRACT

Systems and methods for creating one or more playlists of a predefined length. The invention allows dynamic creation of different playlists for differing times, locations, and other circumstances and also provides for the dynamic selection of products for inclusion in a playlist based on the content of one or more of the individual products. Creation of a playlist may be based on a priority scheme with priority values indicating the relative importance of the products. Creation may also involve determining or adjusting the lengths of one or more products selected for the playlist so that the total length of the playlist will equal a set, predetermined, or otherwise predefined playlist length. Methods and systems according to the present invention provide flexible, efficient, and manageable techniques for creating different playlists of similar product types for both varying circumstances (e.g., time, location, etc.) and varying products of those product types (e.g., clear radar versus radar showing movement of a complex storm system). The invention gives an administrator the ability to simply and easily manage the broadcasting of different playlists for different conditions.

24 Claims, 5 Drawing Sheets

| Order | Product | Optimal | Min | Max | Ext | Skip | :08/:38 Priority Ver. 1 | :18/:48 Priority Ver. 2 | :28/:58 Priority Ver. 3 |
|---|---|---|---|---|---|---|---|---|---|
| 1 | CurrentConditions | 8 | 4 | 11 | | 1 | 1 | 1 | 1 |
| 2 | NWSHeadlines.1 | 7 | 7 | 8 | 8 | 1 | 1 | 1 | 1 |
| 3 | NWSHeadlines.2 | 7 | 7 | 7 | 7 | 0 | 1 | 1 | 1 |
| 4 | RegionalObservationMap | 7 | 6 | 10 | | 1 | 4 | 9 | 4 |
| 5 | LocalObservations | 12 | 10 | 14 | | 1 | 9 | 3 | 9 |
| 6 | RegionalDopplerRadarMap | 8 | 8 | 8 | | 0 | 1 | 1 | 1 |
| 7 | MetroDopplerRadarMap | 12 | 0 | 16 | | 0 | 1 | 1 | 1 |
| 8 | RadarSatelliteComposite | 8 | 8 | 8 | 3 | 0 | 6 | 9 | 5 |
| 9 | Satellite | 8 | 8 | 8 | 3 | 0 | 9 | 10 | 9 |
| 10 | Climatology | 8 | 7 | 10 | 4 | 1 | 8 | 5 | 8 |
| 11 | Almanac | 8 | 7 | 10 | 4 | 1 | 8 | 5 | 8 |
| 12 | RecordHighLow | 8 | 6 | 8 | | 1 | 3 | 8 | 8 |
| 13 | HeatSafetyTips | 8 | 6 | 8 | | 1 | 10 | 3 | 10 |
| 14 | GetawayForecast | 8 | 7 | 10 | | 1 | 6 | 10 | 10 |
| 15 | AirQualityForecast | 7 | 6 | 10 | | 1 | 9 | 4 | 9 |
| 16 | MarineForecast | 10 | 8 | 12 | | 1 | 8 | 8 | 3 |
| 17 | Tides | 8 | 7 | 10 | | 1 | 10 | 10 | 4 |
| 18 | SchooldayWeather | 8 | 7 | 10 | 5 | 1 | 4 | 6 | 6 |
| 19 | OutdoorActivityForecast | 8 | 7 | 10 | 5 | 1 | 4 | 6 | 6 |
| 20 | DaypartForecast | 8 | 7 | 12 | | 1 | 4 | 4 | 5 |
| 21 | RegionalForecastMap.1 | 7 | 6 | 10 | | 1 | 7 | 3 | 7 |
| 22 | RegionalForecastMap.2 | 7 | 6 | 10 | | 1 | 8 | 4 | 8 |
| 23 | MetroForecastMap.1 | 7 | 6 | 10 | | 1 | 3 | 6 | 3 |
| 24 | MetroForecastMap.2 | 7 | 6 | 10 | | 1 | 5 | 7 | 5 |
| 25 | TextForecast | 36 | 28 | 36 | | 0 | 1 | 1 | 1 |
| 26 | ExtendedForecast | 10 | 8 | 12 | 1 | 1 | 2 | 1 | 2 |
| 27 | 7DayForecast | 12 | 10 | 16 | 1 | 1 | 1 | 2 | 1 |
| 28 | TrafficReport.1 | 8 | 7 | 12 | | 1 | 2 | 2 | 2 |
| 29 | TrafficReport.2 | 8 | 7 | 12 | 7 | 1 | 2 | 2 | 2 |
| 30 | TrafficReport.3 | 8 | 7 | 12 | 8 | 1 | 9 | 9 | 9 |
| 31 | TrafficFlow1 | 7 | 7 | 10 | | 1 | 2 | 2 | 6 |
| 32 | TrafficFlow2 | 7 | 7 | 10 | | 1 | 10 | 10 | 10 |

| Order | Product | Optimal | Min | Max | Excl | Step | :08/:38 Priority Ver. 1 | :18/:48 Priority Ver. 2 | :28/:58 Priority Ver. 3 |
|---|---|---|---|---|---|---|---|---|---|
| 1 | CurrentConditions | 8 | 4 | 11 | | 1 | 1 | 1 | 1 |
| 2 | NWSHeadlines.1 | 7 | 7 | 8 | 8 | 1 | 1 | 1 | 1 |
| 3 | NWSHeadlines.2 | 7 | 7 | 7 | 7 | 0 | 1 | 1 | 1 |
| 4 | RegionalObservationMap | 7 | 6 | 10 | | 1 | 4 | 9 | 4 |
| 5 | LocalObservations | 12 | 10 | 14 | | 1 | 9 | 3 | 9 |
| 6 | RegionalDopplerRadarMap | 8 | 8 | 8 | | 0 | 1 | 1 | 1 |
| 7 | MetroDopplerRadarMap | 12 | 0 | 16 | | 0 | 1 | 1 | 1 |
| 8 | RadarSatelliteComposite | 8 | 8 | 8 | 3 | 0 | 6 | 9 | 5 |
| 9 | Satellite | 8 | 8 | 8 | 3 | 0 | 9 | 10 | 9 |
| 10 | Climatology | 8 | 7 | 10 | 4 | 1 | 8 | 5 | 8 |
| 11 | Almanac | 8 | 7 | 10 | 4 | 1 | 8 | 5 | 8 |
| 12 | RecordHighLow | 8 | 6 | 8 | | 1 | 3 | 8 | 8 |
| 13 | HeatSafetyTips | 8 | 6 | 8 | | 1 | 10 | 3 | 10 |
| 14 | GetawayForecast | 8 | 7 | 10 | | 1 | 6 | 10 | 10 |
| 15 | AirQualityForecast | 7 | 6 | 10 | | 1 | 9 | 4 | 9 |
| 16 | MarineForecast | 10 | 8 | 12 | | 1 | 8 | 8 | 3 |
| 17 | Tides | 8 | 7 | 10 | | 1 | 10 | 10 | 4 |
| 18 | SchooldayWeather | 8 | 7 | 10 | 5 | 1 | 4 | 6 | 6 |
| 19 | OutdoorActivityForecast | 8 | 7 | 10 | 5 | 1 | 4 | 6 | 6 |
| 20 | DaypartForecast | 8 | 7 | 12 | | 1 | 4 | 4 | 5 |
| 21 | RegionalForecastMap.1 | 7 | 6 | 10 | | 1 | 7 | 3 | 7 |
| 22 | RegionalForecastMap.2 | 7 | 6 | 10 | | 1 | 8 | 4 | 8 |
| 23 | MetroForecastMap.1 | 7 | 6 | 10 | | 1 | 3 | 6 | 3 |
| 24 | MetroForecastMap.2 | 7 | 6 | 10 | | 1 | 5 | 7 | 5 |
| 25 | TextForecast | 36 | 28 | 36 | | 0 | 1 | 1 | 1 |
| 26 | ExtendedForecast | 10 | 8 | 12 | 1 | 1 | 2 | 1 | 2 |
| 27 | 7DayForecast | 12 | 10 | 16 | 1 | 1 | 1 | 2 | 1 |
| 28 | TrafficReport.1 | 8 | 7 | 12 | | 1 | 2 | 2 | 2 |
| 29 | TrafficReport.2 | 8 | 7 | 12 | 7 | 1 | 2 | 2 | 2 |
| 30 | TrafficReport.3 | 8 | 7 | 12 | 8 | 1 | 9 | 9 | 9 |
| 31 | TrafficFlow1 | 7 | 7 | 10 | | 1 | 2 | 2 | 6 |
| 32 | TrafficFlow2 | 7 | 7 | 10 | | 1 | 10 | 10 | 10 |

FIG. 1

| Order | Product | 120 | 90 | 60 |
|---|---|---|---|---|
| 1 | CurrentConditions | 10 | 10 | 8 |
| 2 | NWSHeadlines.1 | | | |
| 3 | NWSHeadlines.2 | | | |
| 4 | RegionalObservationMap | | 8 | 8 |
| 5 | LocalObservations | 14 | | |
| 6 | RegionalDopplerRadarMap | 12 | 8 | 8 |
| 7 | MetroDopplerRadarMap | | | |
| 8 | RadarSatelliteComposite | | | |
| 9 | Satellite | | | |
| 10 | Climatology | | | |
| 11 | Almanac | 10 | | |
| 12 | RecordHighLow | | | |
| 13 | HeatSafetyTips | | | |
| 14 | GetawayForecast | | | |
| 15 | AirQualityForecast | | | |
| 16 | MarineForecast | | | |
| 17 | Tides | | | |
| 18 | SchooldayWeather | | | |
| 19 | OutdoorActivityForecast | | | |
| 20 | DaypartForecast | 12 | 12 | |
| 21 | RegionalForecastMap.1 | 10 | | |
| 22 | RegionalForecastMap.2 | | | |
| 23 | MetroForecastMap.1 | | | |
| 24 | MetroForecastMap.2 | | | |
| 25 | TextForecast | 36 | 36 | 20 |
| 26 | ExtendedForecast | | | |
| 27 | 7DayForecast | 16 | 16 | 16 |
| 28 | TrafficReport.1 | | | |
| 29 | TrafficReport.2 | | | |
| 30 | TrafficReport.3 | | | |
| 31 | TrafficFlow1 | | | |
| 32 | TrafficFlow2 | | | |
|   |   | 120 | 90 | 60 |

FIG. 2

| Order | Product | Nat'l | SoCal | West |
|---|---|---|---|---|
| 1 | CurrentConditions | ✔ | ✔ | ✔ |
| 2 | NWSHeadlines.1 | ✔ | ✔ | ✔ |
| 3 | NWSHeadlines.2 | ✔ | ✔ | ✔ |
| 4 | RegionalObservationMap | ✔ | ✔ | ✔ |
| 5 | LocalObservations | ✔ | ✔ | ✔ |
| 6 | RegionalDopplerRadarMap | ✔ | ✔ | ✔ |
| 7 | MetroDopplerRadarMap | ✔ | ✔ | ✔ |
| 8 | RadarSatelliteComposite | ✔ | Off | Off |
| 9 | Satellite | Off | ✔ | ✔ |
| 10 | Climatology | Off | Off | Off |
| 11 | Almanac | ✔ | ✔ | ✔ |
| 12 | RecordHighLow | Off | Off | Off |
| 13 | HeatSafetyTips | ✔ | ✔ | ✔ |
| 14 | GetawayForecast | Off | ✔ | ✔ |
| 15 | AirQualityForecast | ✔ | ✔ | ✔ |
| 16 | MarineForecast | Off | Off | Off |
| 17 | Tides | Off | Off | Off |
| 18 | SchooldayWeather | ✔ | ✔ | ✔ |
| 19 | OutdoorActivityForecast | ✔ | ✔ | ✔ |
| 20 | DaypartForecast | ✔ | ✔ | ✔ |
| 21 | RegionalForecastMap.1 | ✔ | ✔ | ✔ |
| 22 | RegionalForecastMap.2 | ✔ | ✔ | ✔ |
| 23 | MetroForecastMap.1 | Off | Off | Off |
| 24 | MetroForecastMap.2 | Off | Off | Off |
| 25 | TextForecast | ✔ | ✔ | ✔ |
| 26 | ExtendedForecast | ✔ | ✔ | ✔ |
| 27 | 7DayForecast | ✔ | ✔ | ✔ |
| 28 | TrafficReport.1 | Off | Off | Off |
| 29 | TrafficReport.2 | Off | Off | Off |
| 30 | TrafficReport.3 | Off | Off | Off |
| 31 | TrafficFlow1 | Off | Off | Off |
| 32 | TrafficFlow2 | Off | Off | Off |

FIG. 3

SYSTEMS AND METHODS FOR CREATING A PLAYLIST

RELATED FIELDS

Embodiments of the present invention relate to the selection of audio, video, and other products provided by a content producing entity, and more specifically, relate to dynamic, circumstance-specific, and content-based selection of such products.

BACKGROUND

The selection and scheduling of audio, video, and other broadcast products provided by a radio station, television station, or other content-producing-entity may be accomplished by creating a playlist of products. Depending on the context, media, and other circumstances, a product may be a video clip, a series of video clips, a single image, a periodically changing image, a sound clip, a series of sound clips, live feed content, and any other suitable item, collection, or grouping of audio, visual, television, radio, or other broadcast content. In the context of television programming, a playlist may be a series of television program products (e.g., one after another) and/or a list describing the duration of each product or other attributes of the products. Thus, a playlist may be information (e.g., a list) or may be the products themselves (e.g., a series of products stored in electronic format). A television broadcast or other signal may be created according to or otherwise using the playlist and sent or otherwise provided to viewers. Playlists may include products originating from different sources and may specify all or a portion of a given product to play (e.g., the first 40 seconds, the last 15 seconds, etc.). A playlist may also specify that content be presented or displayed for set time periods (e.g., displaying a static image on a television screen for 15 seconds) or repeated during a time window (e.g., repeating a 15 second product 3 times during a 45 second window). In some contexts, the products of a playlist will be used to fill a presentation window of a predetermined length (e.g., 2 minutes). There is a need for improved systems and methods to create playlists.

SUMMARY

The invention provides methods for creating one or more playlists of a predefined length. The invention allows dynamic creation of different playlists for differing times, locations, and other circumstances and also provides for the dynamic selection of products for inclusion in a playlist based on the content and/or data validity of one or more of the individual products. Creation of a playlist may be based on a priority scheme with priority values indicating the relative importance of the products. Creation may also involve determining or adjusting the lengths of one or more products selected for the playlist so that the total length of the playlist will equal a set, predetermined, or otherwise predefined playlist length. Methods and systems according to the present invention provide flexible, efficient, and manageable techniques for creating different playlists of similar products for both varying circumstances (e.g., time, location, etc.) and varying products (e.g., clear radar versus radar showing movement of a complex storm system). The invention gives an administrator the ability to simply and easily manage the broadcasting of different playlists for different conditions.

One aspect of the invention is a method of creating a playlist of a predefined playlist length that involves (a) identifying candidate products, (b) determining playlist products using a priority scheme associated with a particular circumstance, and (c) determining a product length for each playlist product so that the combined length of the playlist products is equal to the predefined playlist length. The particular circumstance may be a particular time of day, a particular day, a particular location, particular viewer preferences, or particular viewer demographics. The priority scheme may use priority values associated with the candidate products that indicate the relative importance of the products. Such priority values may also be used to determine the sequence of the products in the playlist. Determining appropriate playlist products may involve validating product content so that only products having valid content are included. Similarly, determining product length may be based in whole or in part upon the actual content of the product.

Another aspect of the invention is a method of creating multiple playlists of a predefined playlist length that involves creating different playlists for different circumstances. The selection of which playlist is created or provided to a viewer or group of viewers may be controlled centrally, may be remotely controlled, may be automatically controlled according to a predefined scheme, and may be monitored through a monitoring and control system. Playlists may be created according to user preferences, user demographics, and other user specific attributes. In the context of media broadcasted over the Internet, a playlist may be generated according to particular priorities, tastes, and preferences provided by or otherwise known with respect to individual users.

FIGURES

FIG. 1 illustrates a chart showing exemplary information used to create one or more playlists according to an embodiment of the present invention.

FIG. 2 illustrates a chart showing exemplary information used to create one or more playlists according to another embodiment of the present invention.

FIG. 3 illustrates a chart showing exemplary information used to create one or more playlists according to another embodiment of the present invention.

DETAILED DESCRIPTION

Introduction

Figure 4:
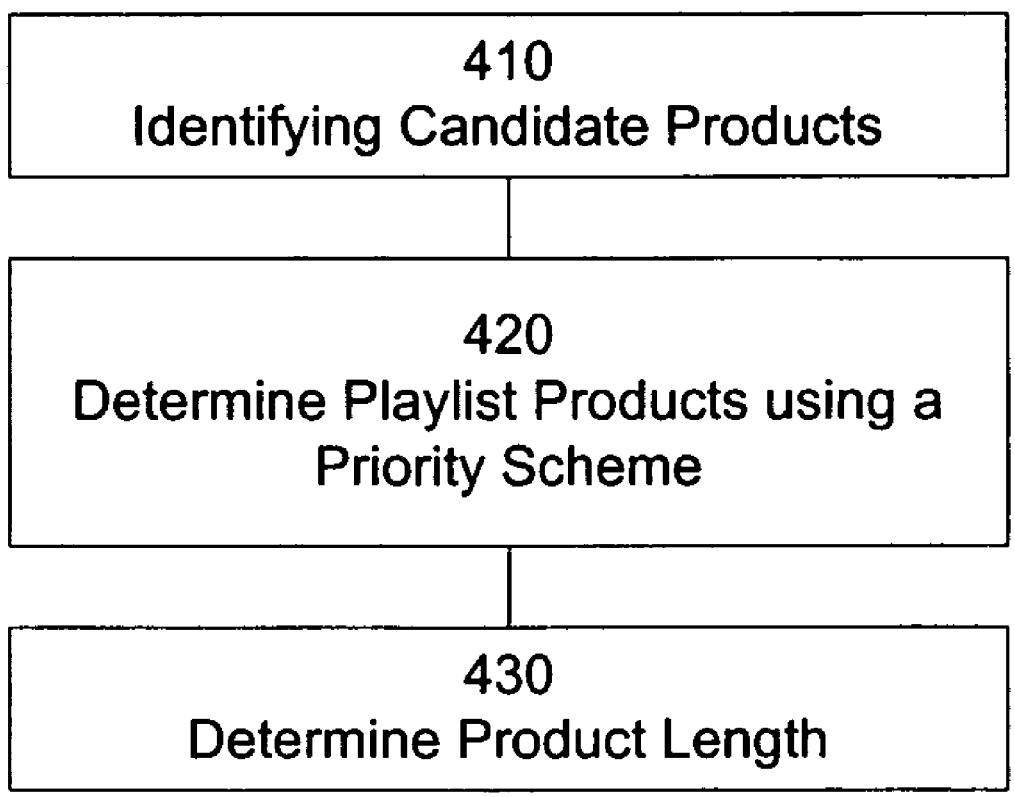
FIG. 4 illustrates a flow chart illustrating one method of creating a playlist according to an embodiment of the invention.

Methods and systems of the invention provide dynamic playlist creation by allowing selection of products and product lengths for specific circumstances. In some embodiments, the invention provides a general set of selection rules or guidelines that are tailored for different anticipated circumstances. The invention provides a framework in which the same group of candidate products may be used in different ways in different circumstances. The general rules allow the individual products to be treated consistently in different circumstances. For example, one or more general rules may be used to ensure that a product is always validated in the same way, always has a set minimum length, or is not used in the same playlist as a certain other product. Specific rules provide flexibility to allow playlists to differ in acceptable ways for different circumstances. For example, priority rules may be used to change the products in playlists at different times of day, on different days, and at different locations.

The following sections provide specific examples of the invention in the context of playlists of weather products for television broadcasts. Accordingly, the following examples describe embodiments of the present invention in the specific case of weather products provided by a weather television broadcaster but are in no way intended to limit the scope or application of the invention to this context or these types of products.

Candidate Products for the Playlists

Referring now to FIG. 1, there are several weather products (e.g., "CurrentConditions," "NWSHeadline.1", etc.) listed in the product column 20. Depending on the context, a product may be a video clip, a series of video clips, a single image, a periodically changing image, a sound clip, a series of sound clips, live feed content, and any other suitable item, collection, or grouping of audio, visual, television, radio, or other broadcast content. In the context of television programming, a playlist may be a series of television program products (e.g., one after another) and/or a list describing the duration of each product or other attributes of the products. Thus, a playlist may be information (e.g., a list) or may be the products themselves (e.g., a series of products stored in electronic format).

General Rules

As described above, general rules may be used to apply to general playlist issues as well as to ensure product consistency in certain respects amongst differing playlists. These rules may also facilitate dynamic, content-based selection by dictating product selection and/or product length based on the content of one or more individual products. For example, in the context of the weather-information related products example, the "RegionalDopplerRadarMap" product may not be included in the playlist when there is no precipitation shown within the product (e.g., when the radar is clear) or when the data is determined to be invalid. Alternatively, in conditions of no precipitation, the product may be a part of the playlist but may have a reduced length of play. Accordingly, rules used to select products of a playlist and/or the length of play of the products may account for or otherwise use the actual content of one or more of the products.

The following is an exemplary list of general playlist rules and guidelines:

If a playlist cannot be created using the desired scheme, then display fallback playlist and notify appropriate persons.

Do not play more than one product from each exclusion group in any playlist.

Display the "Current Conditions" product in each playlist variation, even when data is missing or not valid. If data is valid, the optimal time is the desired display duration. When data is missing or not valid, display "No Report" on "Current Conditions" product and the minimum duration is the desired display duration.

If "NWS bulletins" are valid, the optimal time is the desired display duration. When data is missing or not valid, a zero (:00-seconds) duration is the desired display duration.

For the "RegionalObservationsMap" product, if data is valid, the optimal time is the desired display duration, but when data is missing or not valid, a zero (:00-seconds) duration is the desired display duration.

For the "LocalObservations" product, if data is valid, the optimal time is the desired display duration, but when data is missing or not valid, a zero (:00-seconds) duration is the desired display duration. Both Local Observation pages must display each time the product displays. If the presentation duration for both pages adds up to an odd number of seconds, the first page receives the extra second. If the presentation for both pages adds up to an even number of seconds, both pages display for the same amount of time.

For the "RegionalDopplerRadarMap" product, if either the precipitation threshold has been exceeded or a warning is active, display for the optimal duration, but if neither the precipitation threshold has been exceeded nor a warning is active, display for the minimum. When data is missing or not valid, the optimal duration is the desired display duration.

For the "MetroDopplerRadarMap" product, if both the precipitation threshold has been exceeded and a warning is active, display for the maximum duration, but if either the precipitation threshold has been exceeded or a warning is active, but not both, display for the optimum. If neither the precipitation threshold has been exceeded nor a warning is active, display for the minimum. When data is missing or not valid, a zero (:00-seconds) duration is the desired display duration.

For the "RadarSatelliteComposite" product, if data is valid, the optimal time is the desired display duration, but when data is missing or not valid, a zero (:00-seconds) duration is the desired display duration.

For the "Satellite" product, if data is valid, the optimal time is the desired display duration, but when data is missing or not valid, a zero (:00-seconds) duration is the desired display duration.

For the "Climatology" product, if data is valid, the optimal time is the desired display duration, but when data is missing or not valid, a zero (:00-seconds) duration is the desired display duration.

For the "Almanac" product, if Almanac data is valid, the optimal time is the desired display duration but when data is missing or not valid, a zero (:00-seconds) duration is the desired display duration.

For the "RecordHighLow" product, if data is valid, the optimal time is the desired display duration but when data is missing or not valid, a zero (:00-seconds) duration is the desired display duration.

For the "HeatSafetyTips" product, if data is valid, the optimal time is the desired display duration, but when data is missing or not valid, a zero (:00-seconds) duration is the desired display duration.

For the "GetawayForecast" product, if data is valid, the optimal time is the desired display duration, but when data is missing or not valid, a zero (:00-seconds) duration is the desired display duration.

For the "AirQualityForecast" product, if data is valid, the optimal time is the desired display duration, but when data is missing or not valid, a zero (:00-seconds) duration is the desired display duration.

For the "MarineForecast" product, if data is valid, the optimal time is the desired display duration, but when data is missing or not valid, a zero (:00-seconds) duration is the desired display duration.

For the "Tides" product, if data is valid, the optimal time is the desired display duration, but when data is missing or not valid, a zero (:00-seconds) duration is the desired display duration.

For the "SchooldayWeather" product, if data is valid, the optimal time is the desired display duration, but when data is missing or not valid, a zero (:00-seconds) duration is the desired display duration.

For the "OutdoorActivityForecast" product, if data is valid, the optimal time is the desired display duration, but when data is missing or not valid, a zero (:00-seconds) duration is the desired display duration.

For the "DaypartForecast" product, if data is valid, the optimal time is the desired display duration, but when data is missing or not valid, a zero (:00-seconds) duration is the desired display duration.

For the "RegionalForecastMap" product, if data is valid, the optimal time is the desired display duration, but when data is missing or not valid, a zero (:00-seconds) duration is the desired display duration.

For the "MetroForecastMap" product, if data is valid, the optimal time is the desired display duration, but when data is missing or not valid, a zero (:00-seconds) duration is the desired display duration.

For the "TextForecast" product, when data is missing or not valid, a zero (:00-seconds) duration is the desired display duration.

For the "ExtendedForecast" product, if data is valid, the optimal time is the desired display duration, but when data is missing or not valid, a zero (:00-seconds) duration is the desired display duration.

For the "7DayForecast" product, if data is valid, the optimal time is the desired display duration, but when data is missing or not valid, a zero (:00-seconds) duration is the desired display duration.

For the "TrafficReport" products, if data is valid, the optimal time is the desired display duration, but when data is missing or not valid, a zero (:00-seconds) duration is the desired display duration.

For the "TrafficFlow" products, if data is valid, the optimal time is the desired display duration. If data is valid, and time is available display both pages of the traffic flow product. If time is unavailable to display both products (based upon existing priority rules), rotate the display between the two pages. When data is missing or not valid for an individual Traffic Flow page, a zero (:00-seconds) duration is the desired display duration for that page. Based upon the rotation rules, if the Traffic Flow page that is supposed to display does not have valid data (i.e. all three segments display "Temporarily Unavailable") default to the next Traffic Flow page. If both Traffic Flow pages do not have valid data (i.e. all three segments display "Temporarily Unavailable" on both pages) do not display a Traffic Flow product.

Circumstance Specific Rules

FIG. 1 illustrates a chart showing exemplary information used to create one or more playlists for differing circumstances, in this case different times of day. For each product (e.g., "CurrentConditions," "NWSHeadline.1", etc.) listed in the product column 20, there are priority values listed in the priority columns 30a, 30b, 30c. These priority values, integer numbers ranging from 1 to 10, indicate the relative importance of the products in the priority scheme defined for each priority column 30a, 30b, 30c. For example, in the priority scheme defined by the priority values of first priority column 30a, the products "CurrentConditions," "NWSHeadlines.1," "NWSHeadlines.2," "RegionalDopplarRadarMap," "MetroDopplarRadarMap," "TextForecast," and "7DayForecast" each have a "1" priority value indicating that these products have a higher priority than products "ExtendedForecast," "TrafficReport.1," "TrafficReport.2," and "TrafficFlow1" each having a "2" priority value, which further indicates that these products have a higher priority than products having an "3" priority value, and so on.

Likewise, the priority scheme defined by the other two priority columns 30b, 30c each defines relative relationship between the products listed in the product column 20. Thus, the chart provides three separate priority schemes that may together be part of one larger priority scheme. As indicated in the headings of the priority columns 30a, 30b, 30c, the first priority scheme which is defined by column 30a and labeled "Ver. 1" or "Version 1" is further labeled as ":08/:38" indicating that this priority scheme is used for playlists occurring at 8 minutes after the hour and playlists occurring at 38 minutes after the hour. Similarly, the second and third priority schemes defined by columns 30b and 30c, respectively, are labeled "Ver. 2" and "Ver. 3," respectively, and are further labeled as ":18/:48" and ":28/:58," respectively, again indicating that each priority scheme is used for playlists occurring at certain increments after the hour. In other embodiments, a trigger or message rather than a set time will select a version to play. The provides a user with additional flexibility in scheduling and managing playlists.

The chart 10 of FIG. 1 provides additional information useful in creating one or more playlists. The "Optimal" column 40 provides the optimal length of play of each product. For example, the optimal length of play of the "CurrentConditions" product is 8 seconds. Each product may also have an associated optimal product length, an associated minimum product length (the "min" column 50), an associated maximum product length (the "max" column 60), one or more exclusive indicators (column 70), and a step value (column 80). The three product length values may be used in the determination of the product length for the playlist.

The exclusive indicator is used to ensure that only a single product with a given exclusive indicator is included in any given playlist. Thus, the information in the "Excl" column 70 indicates groupings of products that are exclusive. For example, both the "Climatology" and "Almanac" products have an "Excl" value of "4" indicating that any playlist generated using the information of chart 1 will have at most one of these products. In practice, the selection of which of the exclusive products to use can be made using a variety of suitable techniques, for example the selection could be made randomly, could be based on selecting the higher priority product, could be based on an alternating scheme, or could be based on some other suitable criteria.

The step value may be used to ensure that product length adjustments are made in increments that make sense in the context of the particular product. For example, a step value or increment of "4" for a product will ensure that that product is only adjusted in increments of 4 seconds. This may be beneficial, for example, if the product is a 12 second product having three segments repeating a 4 second video clip. The step value may be used to ensure that the four second video clip is always played in full.

The rules or priority scheme may further be used to indicate an order for products so that once products are identified they are ordered or otherwise sequenced in an appropriate order.

Some of the information such as the priority schemes in the chart 10 facilitates determining one or more playlists by providing circumstance specific rules or priorities for different circumstances, e.g., 8 minutes after the hour, 18 minutes after the hour, etc. The information could be used to fill two-minute long presentation windows occurring periodically, for example at 8, 18, 28, 38, 48, and 58 minutes after each hour.

Fallback Playlists

FIG. 2 illustrates a chart 110 showing exemplary information used to create one or more playlists according to another embodiment of the present invention. In this embodiment, chart 110 again lists multiple products in a products column 120. However, in this case, products are given different play lengths for different presentation window lengths as shown in the play length columns 130a, 130b, 130c. For example, for the 120 second presentation window of the first play length column 130a, the "Current Conditions" product plays for 10 seconds, the "Local Observations" product plays for 14 seconds, the "RegionalDopplerRadarMap" product plays for 12 seconds, the "Almanac" product plays for seconds, the "DaypartForecast" product plays for 12 seconds, the "RegionalForecastMap.1" product plays for 10 seconds, the "TextForecast" plays for 36 seconds, and the "7DayForecast" plays for 16 seconds, giving a total play length of 120 seconds. Accordingly, the chart 120 describes playlists for 3 different presentation window lengths (120 seconds, 90 seconds, and 60 seconds). These may, for example, be used as fallback playlists that are used in the event that an otherwise defined playlist cannot be generated.

Additional Rules

FIG. 3 illustrates a chart 210 showing exemplary information used to create one or more playlists according to another embodiment of the present invention. FIG. 3 illustrates the products which are automatically turned on when a new customer is created. It does not permanently include or exclude any product, but allows them to be manually checked to be included, or unchecked to be excluded. This is done on a case by case basis. In this embodiment, chart 210 again lists a multiple of products in a products column 220. However, in this case, products are checked on or off. For example, for a National playlist the "RadarSatelliteComposite" product is checked in column 230a and is thus a candidate for inclusion in a playlist determined through the techniques of the present invention. In contrast, that product is indicated as "Off" for SoCal (Southern California) and West (western) playlists and is thus not available for inclusion in a playlist related to those categories.

Specific Examples of Playlist Creation

Methods of the present invention may be implemented manually or automated, for example though a computer program. In certain embodiments, a computer program, which may be stored and executed on a computing device having a processor and computer readable medium, determines a playlist using information, such as information and rules as described above. Many suitable variations of automatic, manual, and combination methods may be used.

Referring now to FIG. 4, creation of a playlist according to the present invention may involve three general steps, including identifying candidate products 410, determining playlist products using a priority scheme 420, and determining product length 430. This general process or method may utilize some or all of the rules and techniques described herein.

Figure 5:
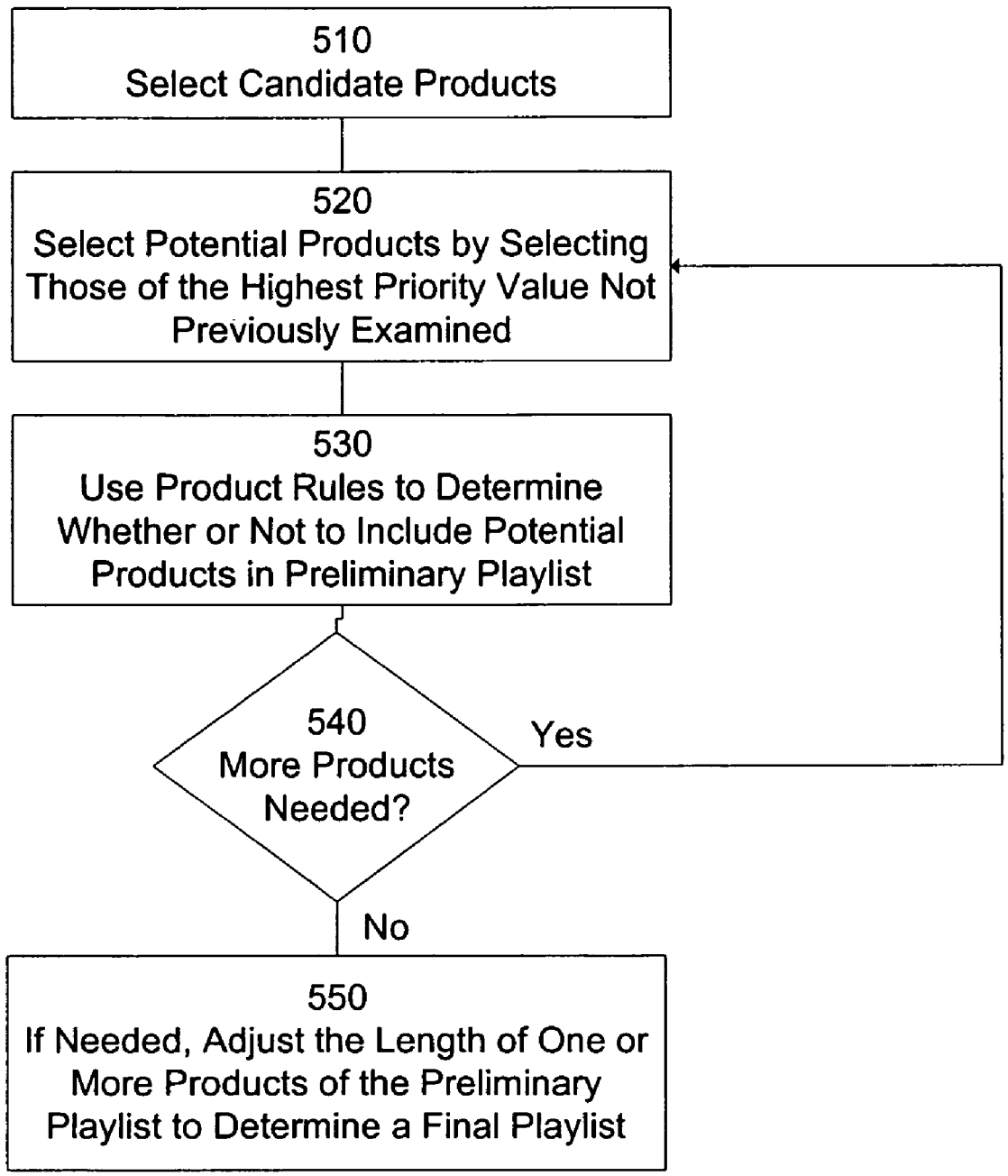
FIG. 5 illustrates a flow chart illustrating another method of creating a playlist according to another embodiment of the invention.

FIG. 5, illustrates a more specific method according to the present invention. This process again begins with selecting candidate products 510. The method selects potential products by selecting those of the highest priority value that have not previously been examined. For example, all of the candidate products having a priority value of "1" may be selected as potential products.

Next, the method uses product rules to determine whether or not to include the potential products in the list. For example, a general rule could be applied to exclude products having invalid content. The remaining products are tested to see if additional products are needed in the More Products Needed decision block 540. For example, the total optimal product lengths of the currently selected products could be compared with a predetermined playlist length. If the total of the selected product optimal lengths is less, the method returns to block 520 to select additional potential products. In this iteration, products of priority "2" may be the next highest since the priority "1" products were already selected.

The method again returns to block 520 to determine whether the newly added products should be included in the preliminary playlist. Once this is done, block 540 again determines whether more products are needed in the preliminary playlist. This loop continues until block 540 determines that no more products are needed, for example, when the total of the optimal product lengths of the products of the preliminary playlist is equal to or exceeds the predetermined playlist length. Note that block 520 may determine to include some but not all of the products having a given priority value based on arbitrary, random, or other selection criteria.

When no more products are needed, the method, if needed, adjusts the length of one or more products of the preliminary playlist to determine a final playlist 550. For example, the play length of one or more of the products of the playlist may be reduced until the total of the product lengths is equal to the predetermined playlist length.

Referring again to the FIG. 1, the order column 90 may be used to indicate the order or sequence products will have in a playlist. For example, products with lower order values will be earlier in the sequence then products with a larger order number.

The following playlists could be generated for the specific indicated circumstances of 8, 18, and 28 minutes after the hour, using the above general rules and the first, second, and third priority schemes defined by the priority columns 30a, 30b, and 30c.

TABLE 1

8 Minutes After Hour

| Time | Product |
|---|---|
| :08:00-:08:08 | CurrentConditions |
| :08:08-:08:15 | NWSHeadlines.1 |
| :08:15-:08:22 | NWSHeadlines.2 |
| :08:22-:08:30 | RegionalDopplarRadarMap |
| :08:30-:08:42 | MetroDopplarRadarMap |
| :08:42-:08:50 | RecordHighLow |
| :08:50-:08:57 | MetroForecastMap1 |
| :08:57-:09:33 | TextForecast |
| :09:33-:09:45 | 7DayForecast |
| :09:45-:09:53 | TrafficReport.1 |
| :09:53-:10:00 | TrafficFlow1 |

TABLE 2

18 Minutes After Hour

| Time | Product |
|---|---|
| :18:00-:18:08 | CurrentConditions |
| :18:08-:18:15 | NWSHeadlines.1 |
| :18:15-:18:22 | NWSHeadlines.2 |
| :18:22-:18:30 | RegionalDopplarRadarMap |
| :18:30-:18:41 | Local Observations |
| :18:41-:18:53 | MetroDopplarRadarMap |
| :18:53-:18:59 | HeatSafetyTips |
| :18:59-:19:35 | TextForecast |
| :19:35-:19:45 | ExtendedForecast |
| :19:45-:19:53 | TrafficReport.1 |
| :19:53-:20:00 | TrafficFlow1 |

TABLE 3

28 Minutes After Hour

| Time | Product |
|---|---|
| :28:00-:28:08 | CurrentConditions |
| :28:08-:28:15 | NWSHeadlines.1 |
| :28:15-:28:22 | NWSHeadlines.2 |
| :28:22-:28:28 | RegionalObservationMap |
| :28:28-:28:36 | RegionalDopplarRadarMap |
| :28:36-:28:48 | MetroDopplarRadarMap |
| :28:48-:28:58 | MarineForecast |
| :28:58-:29:04 | MetroForecastMap1 |
| :29:04-:29:40 | TextForecast |
| :29:40-:29:52 | 7DayForecast |
| :29:52-:30:00 | TrafficReport.1 |

With respect to the playlist shown in Table 1 above, the method of creating the playlist may involve selecting candidate products such as the products listed in the product column 20 of FIG. 1. The products of priority "1" may be selected first, including "CurrentConditions," "NWSHeadlines.1," "NWSHeadlines.2," "RegionalDopplarRadarMap," "MetroDopplarRadarMap," "TextForecast," and "7DayForecast." In this example, we will assume that valid data is found for each product. For "Current Conditions" the general rules tell us that if the data is valid, the optimal time (8 seconds) is the desired display duration. For "NWSHeadlines.1," "NWSHeadlines.2," which are "NWS bulletins" since the data is valid, the optimal time is the desired display duration (7 seconds each). For the "RegionalDopplerRadarMap" product, assume, in this example, that the precipitation threshold has been exceeded and thus under the general rules the desired display is for the optimal duration (8 seconds). For the "MetroDopplerRadarMap" product, assume the precipitation threshold has been exceeded but that a warning is not active, indicating to display for the optimal duration (12 seconds) under the general rules. For the "TextForecast" product, use the optimal display duration (36 seconds). Finally, for the "7DayForecast" product the optimal time (12 seconds) is the desired display duration.

The total duration of the priority "1" products which comprise the current or preliminary playlist is 90 seconds (8+7+7+8+12+36+12). While it may be possible to adjust the play lengths upwards to fill the remaining 30 seconds, in this case, it is determined that additional products are needed based on a rule that products will be selected until the predetermined playlist length is exceeded. Of course, other embodiments follow alternative selection schemes.

Next, the products of priority "2" are selected, including "ExtendedForecast," "TrafficReport.1," "TrafficReport.2," and "TrafficFlow1." However, the "ExtendedForecast" product is excluded, according the priority scheme, from the list because the "7DayForecast" product, which has the same "Excl" value, is included. Likewise, the "TrafficReport.2" product is excluded because the "NWSHeadlines.2" product, which has the same "Excl" value, is included.

Thus only "TrafficReport.1" and "TrafficFlow1" are considered. For the "TrafficReport" product the optimal time (8 seconds) is the desired display duration. For the "TrafficFlow" product the optimal time (7 seconds) is also the desired display duration. The total duration of the priority "1" and "2" products which comprise the current or preliminary playlist is 105 seconds (90+15). Again, while it may be possible to adjust the play lengths upwards to fill the remaining 15 seconds, in this case, it is determined that additional products are needed based on the rule that products will be selected until the predetermined playlist length is exceeded.

Next, the products of priority "3" are selected, including "RecordHighLow" and "MetroForecastMap1." For the "RecordHighLow" product the optimal time (8 seconds) is the desired display duration. For the "MetroForecastMap1" product the optimal time (7 seconds) is also the desired display duration. The total duration of the priority "1" "2" and "3" products which comprise the current or preliminary playlist is 120 seconds (105+15). Thus, in this case, the optimal lengths of the individual products add up to exactly 120 seconds (2 minutes) and no adjustment of individual products is needed. The products are ordered according to their order number. In other embodiments, order may be selected by a variety of suitable techniques. The following Table 4 summarizes the information discussed above for this example:

TABLE 4

| Order | Time | Product | Priority | Opt Length (sec) | Play Length (sec) |
|---|---|---|---|---|---|
| 1 | :08:00-:08:08 | CurrentConditions | 1 | 8 | 8 |
| 2 | :08:08-:08:15 | NWSHeadlines.1 | 1 | 7 | 7 |
| 3 | :08:15-:08:22 | NWSHeadlines.2 | 1 | 7 | 7 |
| 6 | :08:22-:08:30 | RegionalDopplarRadarMap | 1 | 8 | 8 |
| 7 | :08:30-:08:42 | MetroDopplarRadarMap | 1 | 12 | 12 |
| 12 | :08:42-:08:50 | RecordHighLow | 3 | 8 | 8 |
| 23 | :08:50-:08:57 | MetroForecastMap1 | 3 | 7 | 7 |
| 25 | :08:57-:09:33 | TextForecast | 1 | 36 | 36 |
| 27 | :09:33-:09:45 | 7DayForecast | 1 | 12 | 12 |
| 28 | :09:45-:09:53 | TrafficReport.1 | 2 | 8 | 8 |
| 31 | :09:53-:10:00 | TrafficFlow1 | 2 | 7 | 7 |
| — | — | — | — | 120 | 120 |

Adjusting Product Play Length when Necessary

The playlist for the 18 and 48 minutes after the hour two-minute presentation windows differ because the priority scheme of the second priority column 30b is used, as illustrated in Table 2 below:

TABLE 5

| Ord | Time | Product | Priority | Opt (sec) | Min (sec) | Play (sec) |
|---|---|---|---|---|---|---|
| 1 | :18:00-:18:08 | CurrentConditions | 1 | 8 | 4 | 8 |
| 2 | :18:08-:18:15 | NWSHeadlines.1 | 1 | 7 | 7 | 7 |
| 3 | :18:15-:18:22 | NWSHeadlines.2 | 1 | 7 | 7 | 7 |
| 6 | :18:22-:18:30 | RegionalDopplarRadarMap | 1 | 8 | 8 | 8 |
| 5 | :18:30-:18:41 | Local Observations | 3 | 12 | 10 | 11 |
| 7 | :18:41-:18:53 | MetroDopplarRadarMap | 1 | 12 | 0 | 12 |
| 13 | :18:53-:18:59 | HeatSafetyTips | 3 | 8 | 6 | 6 |
| 25 | :18:59-:19:35 | TextForecast | 1 | 36 | 28 | 36 |
| 26 | :19:35-:19:45 | ExtendedForecast | 1 | 10 | 8 | 10 |
| 28 | :19:45-:19:53 | TrafficReport.1 | 2 | 8 | 7 | 8 |
| 31 | :19:53-:20:00 | TrafficFlow1 | 2 | 7 | 7 | 7 |
| — | — | — | — | 123 | 92 | 120 |

In this case, the "7DayForecast" product is excluded, according the priority scheme, from the list because the included "ExtendedForecast" product has the same "Excl" value but has a greater priority value. The "TrafficReport.2" product is again excluded because the "NWSHeadlines.2" product, which has the same "Excl" value, is included. The optimal length of the preliminary products totals 2 minutes and 3 seconds (123 seconds). The total play lengths is reduced to exactly 2 minutes (120 seconds) by reducing, beginning with the lower priority products, the play length of the individual products where minimum length values allow it. In this case, the length of "HeatSafetyTips" was reduced by 2 seconds and "Local Observations" was reduced by 1 second. In certain embodiments, selection of which products to reduce in play length is based on other suitable criteria or is determined randomly. In certain embodiments adjustments may be made to increase product play length up to the max values specified in the "Max" column. A variety of suitable adjustment techniques may be used in the present invention to ensure that a playlist fits a given presentation window. Also note that the products are ordered according to their order number, but that other embodiments may utilize any suitable technique to order (e.g., randomly, alphabetically, according to length, according to customer preference rules particular to a particular circumstance) or simply not order the products.

Additional Embodiments

Modifications, additions and deletions may be made to the embodiments described above and shown in the accompanying figures without departing from the scope or spirit of the present invention. For example, while the devices and methods described primarily relate to television and radio, other modes of providing information to consumers are envisioned. As another example, although the invention is primarily discussed in the context of charts describing information used to determine playlist products and product lengths, the use of a chart is not required and any suitable manual or automatic method of determining playlist products and product lengths according to the principles of the present invention may by used. In addition, the present invention is not limited to weather content or any other particular subject matter.

The invention claimed is:

1. A method of creating a playlist of a predefined playlist length comprising:
    identifying candidate products for potential inclusion in the playlist;
    determining playlist products using a priority scheme associated with a particular circumstance, wherein the playlist products are a subset of the candidate products;
    determining a product length for each playlist product so that a combined length of the playlist products is equal to the predefined playlist length; and
    adjusting the product length of at least one playlist product to a value between a minimum length and maximum length that is associated with each playlist product if the combined length of the playlist products is not equal to the predefined playlist length.

2. The method of claim 1, wherein each product has an associated optimal product length and the product length determined for at least one of the playlist products is the associated optimal product length.

3. The method of claim 1, wherein the product length determined for at least one of the playlist products is the associated minimum product length.

4. The method of claim 1, wherein the product length determined for at least one of the playlist products is the associated maximum product length.

5. The method of claim 1, wherein the priority scheme comprises priority values associated with the candidate products and indicating the relative importance of the products such that products associated with the same priority value have the same relative importance and a first product associated with a first priority value has a greater relative importance than a second product associated with a second priority value.

6. The method of claim 5 further comprises using the priority value of each product in the subset to determine a sequence of products in the playlist.

7. The method of claim 5, wherein the priority scheme further comprises an exclusive indicator associated with each product of a subset of products.

8. The method of claim 7, wherein determining the playlist products further comprises selecting only a single product from the subset of products.

9. The method of claim 5, wherein determining the product length for each playlist products comprises adjusting the product length for playlist products having a same priority value using an assigned step value for each product.

10. The method of claim 1, wherein determining the playlist products further comprises validating product content such that only products having valid content are included.

11. The method of claim 1, wherein determining the product length for at least one playlist products comprises adjusting the length of the product based on content of the product.

12. The method of claim 1, wherein the circumstance is a time of day.

13. The method of claim 1, wherein the circumstance is a day.

14. The method of claim 1, wherein the circumstance is a location.

15. A method of creating playlists of a predefined playlist length comprising:
    identifying candidate products for potential inclusion in the playlists;
    creating a first playlist by (a) determining first playlist products using a first priority scheme associated with a first circumstance, wherein the first playlist products are a subset of the candidate products; (b) determining a length for each first playlist product so that a combined length of the first playlist products is equal to the predefined playlist length; and (c) adjusting the product length of at least one of the first playlist products to a first value between a minimum length and maximum length that is associated with each playlist product if the combined length of the first playlist products is not equal to the predefined playlist length; and
    creating a second playlist by (a) determining second playlist products using a second priority scheme associated with a second circumstance, wherein the second playlist products are a subset of the candidate products; (b) determining a length for each second playlist product so that a combined length of the second playlist products is equal to the predefined playlist length; and (c) adjusting the product length of at least one of the second playlist products to a second value between the minimum length and the maximum length that is associated with each playlist product if the combined length of the second playlist products is not equal to the predefined playlist length.

16. The method of claim 15, wherein the first circumstance is a first time of day and the second circumstance is a second time of day.

17. The method of claim 15, wherein the first circumstance is a first day and the second circumstance is a second day.

18. The method of claim 15, wherein the first circumstance is a first location and the second circumstance is a second location.

19. The method of claim 15, wherein the first circumstance relates to user preferences.

20. The method of claim 15, wherein the first circumstance relates to user demographics.

21. The method of claim 15 further comprising remotely controlling selection of the first playlist or second playlist.

22. The method of claim 15 further comprising scheduling the use of the first playlist and second playlist.

23. A method of creating a playlist of a predefined playlist length comprising:

identifying candidate products for potential inclusion in the playlist;

determining playlist products by determining product priority and product validity, wherein the playlist products are a subset of the candidate products;

determining a product length for each playlist product so that a combined length of the playlist products is equal to the predefined playlist length; and adjusting the product length of at least one playlist product to a value between a minimum length and maximum length that is associated with each playlist product if the combined length of the playlist products is not equal to the predefined playlist length.

24. The method of claim 23, further comprising determining an order for the playlist products using a product order value associated with each product.

\* \* \* \* \*

UNITED STATES PATENT AND TRADEMARK OFFICE
CERTIFICATE OF CORRECTION

| | | |
|---|---|---|
| PATENT NO. | : 7,730,420 B1 | Page 1 of 1 |
| APPLICATION NO. | : 11/416599 | |
| DATED | : June 1, 2010 | |
| INVENTOR(S) | : Toby Miller | |

It is certified that error appears in the above-identified patent and that said Letters Patent is hereby corrected as shown below:

Column 7,
Line 9, after "for", insert --10--.

Signed and Sealed this

Twenty-fourth Day of August, 2010

David J. Kappos
*Director of the United States Patent and Trademark Office*